United States Patent [19]

Kulig

[11] Patent Number: 4,690,703
[45] Date of Patent: Sep. 1, 1987

[54] MOLD COOLING ARRANGEMENT FOR USE IN A GLASSWARE FORMING MACHINE

[75] Inventor: Constantine W. Kulig, Windsor, Conn.

[73] Assignee: Emhart Industries, Inc., Farmington, Conn.

[21] Appl. No.: 853,538

[22] Filed: Apr. 18, 1986

[51] Int. Cl.⁴ ............................................. C03B 9/38
[52] U.S. Cl. ....................................... 65/265; 65/267; 65/319; 65/356
[58] Field of Search .................. 65/265, 267, 319, 356

[56] References Cited

U.S. PATENT DOCUMENTS 4,251,253  2/1981  Becker et al. ..................... 65/356 X

FOREIGN PATENT DOCUMENTS 0102820  3/1984  European Pat. Off. ............. 65/267

Primary Examiner—Arthur Kellogg
Attorney, Agent, or Firm—H. Samuel Kieser

[57] ABSTRACT

A mold arrangement for a glassware forming machine in which the side portions of the mold have vertically extending cooling passages therein which communicate through a bottom plate and a distributor plate with a plenum chamber. The plenum chamber has openings which have a vertical interface with openings in the machine frame for passage of cooling air.

3 Claims, 3 Drawing Figures

MOLD COOLING ARRANGEMENT FOR USE IN A GLASSWARE FORMING MACHINE

In a glassware forming machine of the so-called "individual section" type, a number of container making units or sections arranged side by side, are fed with glass from a common source, and feed their output to a common conveyer. Each of these sections has at least one parison mold in which a parison is formed from a gob of molten glass delivered to the mold, and at least one blow mold in which parisons are blown to the final shape of the container. In general, the blow mold comprises a stationary bottom plate which defines the bottom portion of a cavity of the mold and two side portions defining side portions of the cavity. The two side portions are mounted on mold holder arms which are moveable to move each side portion toward each other into a first, closed position in which each side portion engages the bottom plate and each other so that a cavity is defined by the side portions and the bottom plate. The mold holder arms are also moveable away from each other into a second, open position wherein the side portions are separated to allow the molded article to be removed from the mold.

Since the molds of an individual section type glassware forming machine absorb heat from the glass at a rate which is faster than the heat can be dissipated to the surrounding atmosphere without additional cooling, such molds are supplied with cooling means which cool the mold so that it remains at a substantially constant average temperature during successive operations of the machine. Because the sections of an individual section type machine need to be close together for reasons of glass supply, only very limited space is available around the mold for the provision of cooling means.

In one type of an individual section type glassware type forming machine as shown in U.S. Pat. No. 4,070,174, the cooling of the mold is accomplished by applying cooling air through a vertical interface between the mold holder arm structure and the fixed machine frame whereby air is supplied into an internal chamber in the mold holder arm structure. Nozzles are provided which are orientated generally tangentially to the cylindrical outside surface of the mold segments whereby a circulatory flow of cooling air is created around the cylindrical split mold segments. With this arrangement, it is difficult to provide differential cooling around the mold.

In the specification of European application No. 83304985-1 (publication No. 0102820), there is described a mold arrangement in which a plenum chamber extends beneath the side portions of the mold when they are in their closed positions and which has one or more exits which open upwardly and communicate, when the side portions are above the plenum chamber, either directly, or through vertical passages in the bottom plate, with the entrances of cooling passages in the side portions of the mold so that air supply to each cooling passage has substantially the same pressure. The plenum chamber has an entrance which is connected to a supply of cooling air which passes into the plenum chamber in a vertical direction.

The mold cooling arrangement disclosed in the European application has advantages over the prior art. However, the mechanism disclosed therein is not applicable to all existing machines without requiring extensive modifications of the machine.

It is an object of the present invention to provide an improved mold cooling arrangement.

It is a further object of the present invention to provide improved mold cooling arrangement which has the advantages of the arrangement disclosed in the abovementioned European application and which can utilize the existing opening for the supply of cooling air which was previously used to apply cooling air to the mold holder arm structure at a vertical interface between the mold holder arm structure and the machine frame in a conventional glassware forming machine.

SUMMARY OF THE INVENTION

The objects of this invention may be achieved through the provision of a mold cooling arrangement for use in a glassware forming machine which comprises a bottom plate defining a bottom portion of a cavity of a mold in which molten glass is molded in the operation of the machine and two mold side portions defining the side portions of the cavity. The side portions are moveable between a first position wherein the side portion are in engagement with the bottom plate and each other to define the cavity of the mold and a second position wherein the side portions are spaced from each other to allow the molded glass to be removed. Cooling passages are provided in each of the mold side portions through which cooling air can pass to cool the side portions. Each cooling passage has an entrance in a bottom surface of a side portion and passes upwardly through that side portion. A stationary frame has at least one outlet extending in a vertical plane for the horizontal passage of cooling air. The mold side portions are mounted on the frame for movement with respect thereto. A bottom plate mechanism is mounted on the frame and has a plenum chamber mounted thereon. The plenum chamber has at least one upwardly opening outlet and at least one inlet extending in a vertical plane for the passage of the cooling air therethrough. The entrances of the cooling passages in the mold side portions are positioned over the upwardly opening outlet of the plenum chamber when they are in their closed position. The inlet of the plenum chamber is in communication with the outlet in the frame. A distributor plate is positioned over the upwardly opening outlet of the plenum chamber and has cooling passages extending upwardly therethrough communicating with the upwardly opening outlet in the plenum chamber. Cooling passages are provided in the bottom plate which communicate the respective cooling passage in the mold side portions and with a respective cooling passage in said distributor plate.

DETAILED DESCRIPTION

Figure 1:
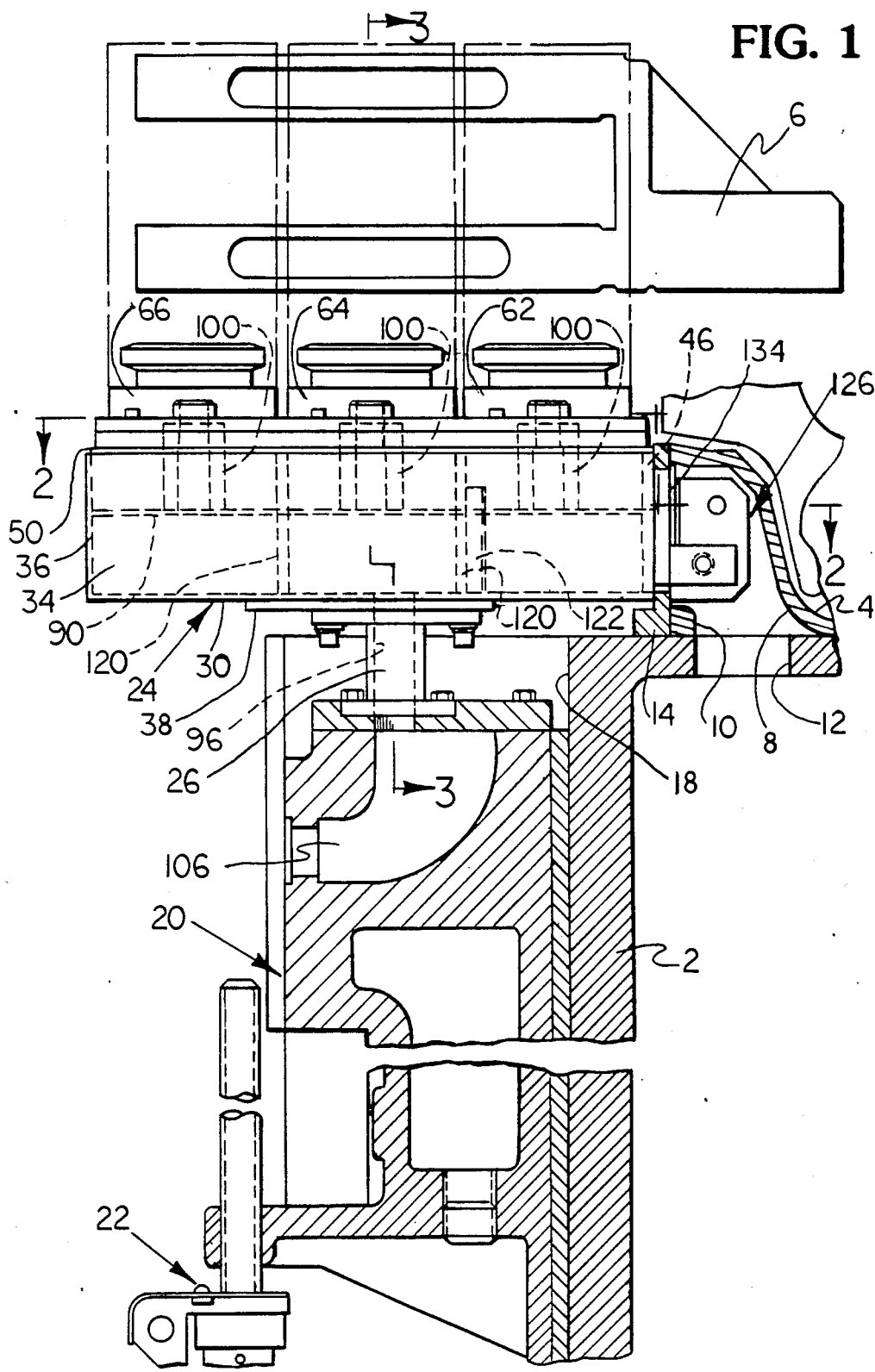
FIG. 1 is a side view, partially in section of the mold cooling arrangement of the present invention mounted on the frame of an individual section glassware forming machine.

Referring to the drawings and in particular FIG. 1, there is shown a fixed section frame 2 of an individual section of an IS machine. Attached to the frame 2 is a bracket assembly 4 upon which the mold holder arms 6 are mounted in a manner such as described in the U.S. Pat. No. 4,070,174. The bracket assembly 4 includes a cooling wind passage 8 having an entrance opening 10 extending in a horizontal plane which communicates with an opening 12 in the frame 2. The opening 12 is connected to a source of cooling air within the machine's fixed structure. The forward portion of the bracket assembly 4 includes a machined plate 14 having two vertically disposed exit openings 16 therein which communicate with the cooling wind passage 8 in the bracket assembly 4. Mounted within a vertically extending slideway 18 in the frame 2 is a bottom plate mechanism 20. The bottom plate mechanism 20 is vertically adjustable in the slideway 18 by means of a jack screw arrangement 22.

A plenum chamber 24 is attached to the bottom plate mechanism 20 by means of an adapter 26. The plenum chamber 24 is defined by a top surface 28, a bottom surface 30, two side portions 32 and 34 and a forward portion 36. As will be noted particularly in FIG. 2, the width of the plenum chamber is greater at the rear portion than at the forward portion. The bottom surface 30 of the plenum chamber 24 has a machined insert plate 38 attached thereto provided with a groove 40 therein extending from the front to the rear of the plate. The groove 40 mates with a tongue 42 on the top surface of the adapter 26. This arrangement permits some movement of the plenum chamber 24 in the direction of the groove 40 relative to the adapter 26 before the bolts 44 are tightened to secure the plenum chamber 24 to the adapter 26 on the bottom plate mechanism 20.

The plenum chamber 24 has a machined back plate member 46 welded to the top and bottom surfaces 28 and 30 at the rear thereof. The plate member 46 forms two vertically disposed openings 48 in the plenum chamber 24. The plenum chamber 24 is positioned on the bottom plate mechanism 20 and that the plate member 46 bears directly against the machined plate 14 of the bracket assembly 4 and the openings 48 in the rear of the plenum chamber 24 communicate with a respective opening 16 in the plate 14 of the bracket assembly 4.

A machined metal plate insert 50 is welded in the top surface 28 of the plenum chamber 24 and has a generally rectangular opening 52 therein. A distributor plate 54, having a plurality of cooling passages 56 therein, extends over the opening 52 in the plate 50. A spacer 58 may be provided between the plate 50 and the distributor plate 54. The spacer 58 has an opening 60 therein substantially the same size as the opening 52 in the plate 50. The thickness of the spacer may be varied or more than one space may be used depending upon the height of the bottom of the mold halves used with the system.

Figure 3:
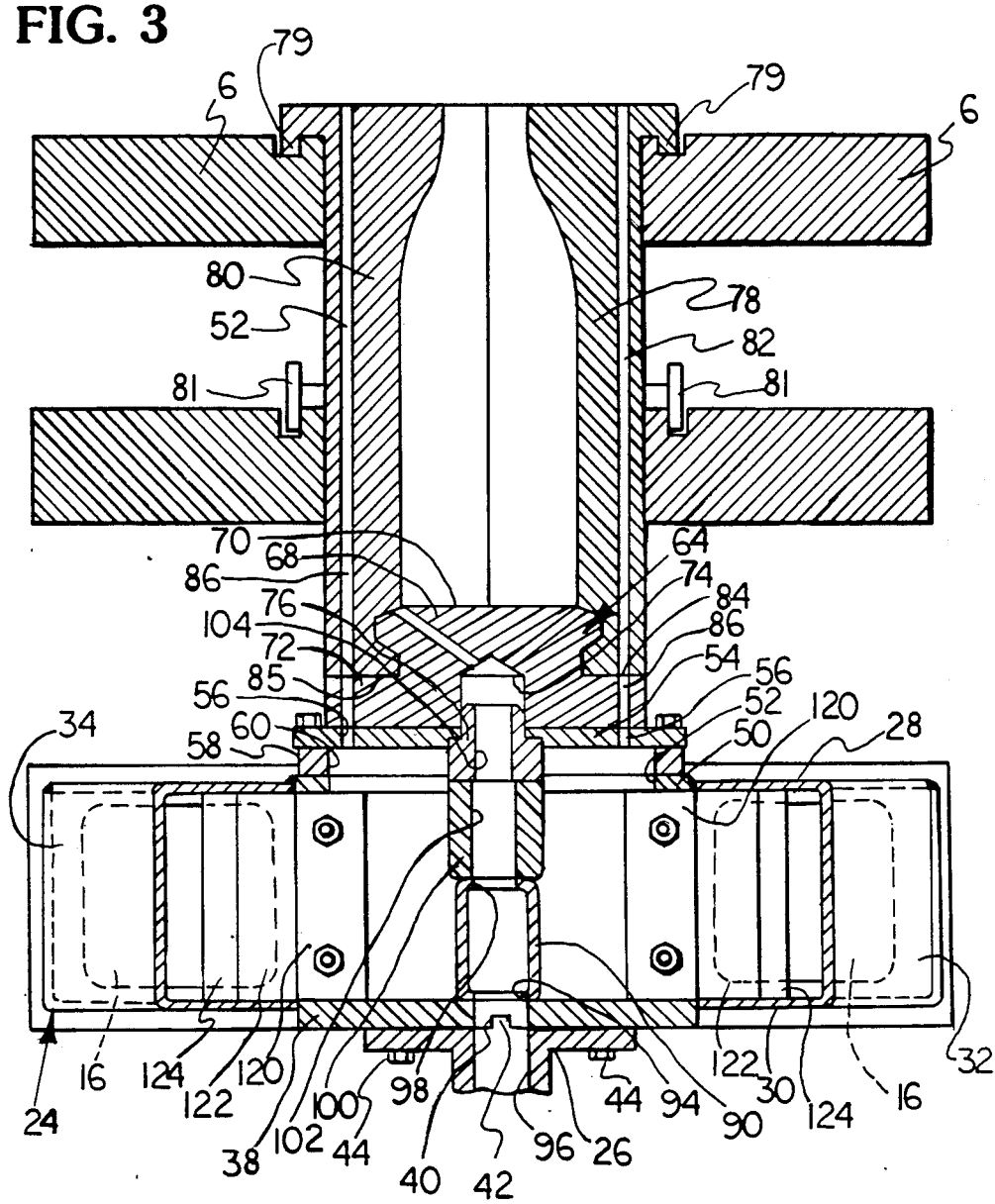
FIG. 3 is a partial vertical sectional view taken along the lines 3—3 of FIG. 1.

As shown in FIG. 1, there are three bottom plates 62, 64 and 66 mounted on the distributor plate 54 and having their axes aligned in a vertical plane which extends perpendicular to the back surface of the plenum chamber 24. Each of the bottom plates 62, 64 and 66 include a raised section 68 which has an upper surface 70 which defines the bottom portion of the cavity of a mold, and a bottom flange portion 72. Each of the bottom plates 62, 64, and 66 may have a chamber 74 as shown in FIG. 3 from which vacuum can be applied in a conventional manner to the mold. Each bottom plate 62, 64, 66 is located on the distributor plates by means of a locating spacer 76.

The pair of mold holder arms 6 are mounted on the bracket assembly 4 in the manner set forth in U.S. Pat. No. 4,070,174. The difference between the arrangement shown in U.S. Pat. No. 4,070,174 and the present arrangement is that the bottom portion of each of the mold holder arms is removed so as to not cover the exit openings 16 in the plate member 14 and thus interfere with the positioning of the plenum chamber 24 against the plate 14 of the bracket assembly 4.

Each of the three mold cavities is formed by a pair of mold side portions 78 and 80 which are mounted on the mold holder arms 6 by means of an upper mounting lip 79 and intermediate mounting button 81 as shown in FIG. 3. The mold side portions 78 and 80 are moveable by the mold holder arms 6 into a first position wherein they are in engagement with each other and their respective bottom plates 62, 64, or 66 as shown in FIG. 3 to form the mold cavity. The mold holder arms 6 are moveable, in accordance with the teaching of the U.S. Pat. No. 4,070,174, away from each other to move the mold side portions 78 and 80 into a second position wherein they are spaced apart to allow the article formed in a mold to be removed therefrom. Each of the side portions 78 and 80 include vertically extending cooling passages 82 extending therethrough which are circumferentially spaced around the mold side portions 78 and 80. Each of cooling passages has an entrance 85 in the bottom surface 86 of one of the side portions 78 or 80.

The flange portion 72 of each of the bottom plates 62, 64 and 66 is also provided with vertically extending cooling passages 86 which communicate with a respective cooling passage 82 in the mold side portions 78 and 80 when the mold side portions are in their closed position. The passages 86 in the bottom plates in turn communicate with the cooling passages 56 extending vertically through the distributor plate 54 which have an entrance communicating with the interior of the plenum chamber 24, thereby providing communication between the interior of the plenum chamber 24 and the entrances of the cooling passages 86 in the moulded side portions 78 and 80.

An elongated manifold 90 is positioned within the plenum chamber 24 extending from the front surface 42 to the back plate member 46. The manifold 90 has an opening 92 therein positioned in axial alignment with an opening 94 in the machined insert plate member 38 which in turn is aligned with a passageway 96 in the adapter 26. The top edge of the manifold 90 is provided with a series of openings 98 each of which is coaxial with one of the bottom plates 62, 64, and 66 and communicates with a tubular member 100 welded to the manifold 90. Each tubular member 100 has a passageway 102 therethrough which is in alignment with a passageway 104 in the locating spacer 76 which in turn communicates with the chamber 74 in one of the bottom plates 62, 64 or 66. the passageway 96 in the adapter 26 communicates with a passageway 106 within the bottom plate mechanism which is connected to a source of vacuum or air depending upon the forming process being used.

A series of vertically extending braces 120 are provided within the plenum chamber 24 and are attached to the inner surface of the top and bottom surfaces 28 and 30 thereof. One set of these are provided between each of the bottom plates 62, 64 and 66 and are positioned vertically beneath the upper machined plate insert 50. Attached to the bracers 120 positioned between the innermost and intermediate bottom plates 62 and 64 are vanes 122 which . extend generally parallel to the vertical interface between the plenum chamber 24 and bracket assembly 4 and which terminate in an inwardly directed angular portion 124. The respective vanes 122 extend toward the side portions of the plenum chamber 24 a distance such that they overlap a portion of the exit openings 16 in the metal plate 14 of the bracket assembly 4. The vanes 122 help to direct air in the plenum chamber 24 to the region below the innermost bottom plate 62.

Figure 2:
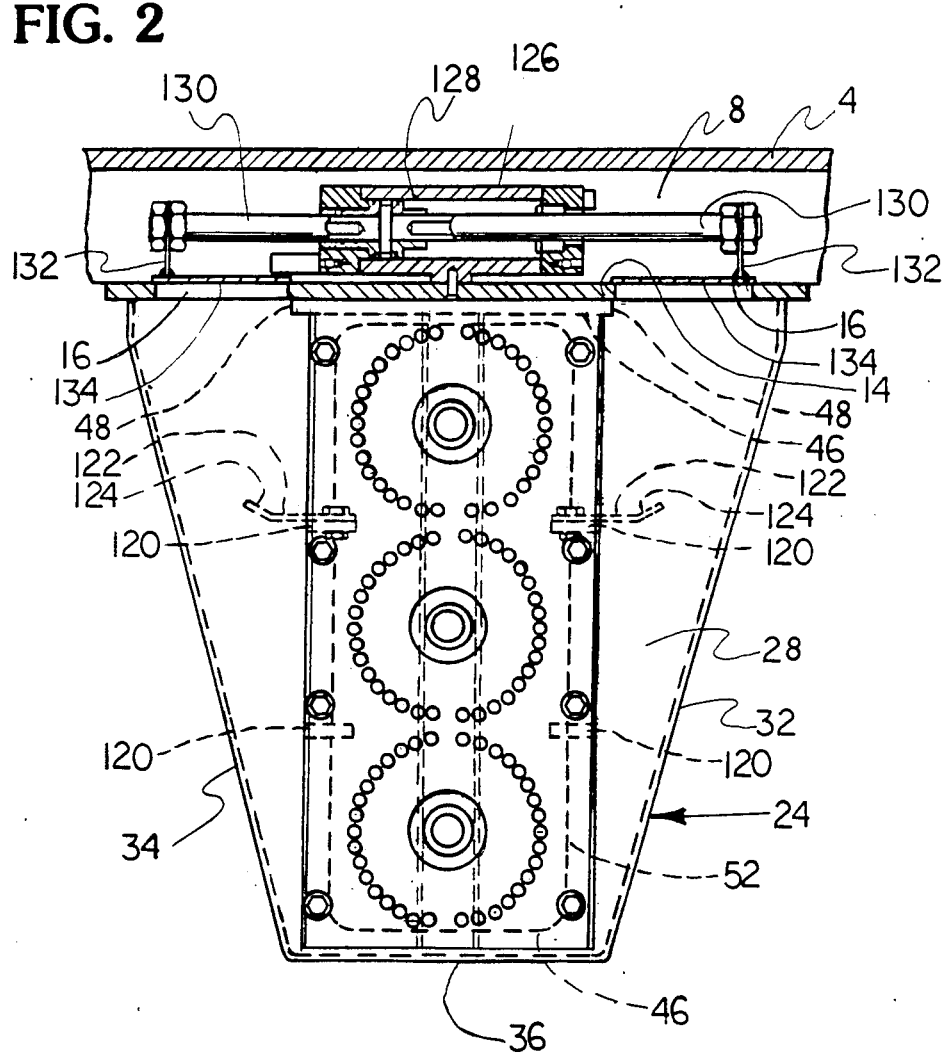
FIG. 2 is a horizontal view, partially in section, taken along the lines 2—2 of FIG. 1 with the mold holder arms and bottom plate omitted for the sake of clarity.

An arrangement 126 is mounted within the bracket assembly 4 to provide for the opening and closing of the exit opening 16 in the metal plate 14 of the bracket assembly 4. The arrangement 126 may include a dual piston and cylinder assembly 128 (which is air operated by suitable means, not shown) wherein the piston rods 130 extend in opposite directions from each other and each have their end portions attached by a connecting bar 132 to a slideable damper member 134. When the piston rods 130 are in their extended position as shown in FIG. 2, the damper members 134 are positioned over the exit openings 16 in the plate 14 of the bracket assembly, thereby shutting off the supply of cooling air to the plenum chamber 24. When the piston rods 130 are moved in the opposite direction, the damper members 134 are drawn toward each other each other, thereby exposing the openings 16 and permitting cooling air to flow into the plenum chamber 24.

In the operation of the illustrated mold arrangement, a parison is located above each of the bottom plates 62, 64, 66 while the mold side portions 78 and 80 of the respective molds are in their open position. The mold holder arms 6 then move the mold side portions 78 and 80 into their closed positions so the mold cavity is formed around the parison. When the mold side portions are in their closed position, the damper members 134 are opened so that cooling air is blown through the exit openings 16 in the bracket assembly 4 into the plenum chamber 24. The plenum chamber 24 serves to equalize the pressure within the chamber and underneath the various passages 56 in the distributor plate 54. The cooling air passes through the cooling passages 56 in the distributor plate 54 up through the cooling passages 86 in the bottom plates 62, 64, 66 and the passageways 82 in each of the mold side portions 78 and 80. After the parison is formed into the final shape, the damper members 134 are moved to their closed position whereby cooling air from the exit passageways 16 is blocked and the mold side portions 78 and 80 of the mold are then moved to their open position to allow the blown article to be removed from the mold.

Although reference has been made above to a specific embodiment of the present invention, it will be apparent to those skilled in the art that various modifications and alterations may be made thereto without departing from spirit of the present invention. Therefore, it is intended that the scope of this invention be ascertained by reference to the following claims.

What is claimed is:

1. A glassware forming machine comprising
   mold cavity means including bottom means and opposing side means,
   said bottom and side means having vertically extending cooling passages therein,
   air plenum means defined by one long end wall, an opposed short end wall, a pair of inwardly inclined side walls forming with said end walls a keystone configuration, and top and bottom walls,
   means for mounting said mold cavity means on the top wall of said air plenum means with said cooling passages communicating with the interior of said plenum means and with said mold cavity means centered on a line bisecting said end walls,
   horizontally spaced opening means in said long end wall,
   second air plenum means communicating with said first air plenum means through said horizontally spaced opening means so that air under pressure can be fed from said second air plenum means into said first air plenum means towards said short end wall, said inclined side walls being located outwardly from said mold cavity means so that the air will be directed centrally inwardly towards said mold cavity means.

2. A glassware forming machine according to claim 1, wherein said mold cavity means defines a plurality of mold cavities and further comprising
   vane means intermediate said first air plenum end walls and spaced from said first air plenum side walls for redirecting the air inwardly towards said mold cavity means.

3. A glassware forming machine according to claim 2, wherein said vane means comprises a pair of vanes extending between the top and bottom walls of said first air plenum means.

* * * * *